(12) United States Patent
Kim

(10) Patent No.: US 7,114,085 B1
(45) Date of Patent: Sep. 26, 2006

(54) PORTABLE STORAGE DEVICE STARTUP

(75) Inventor: Timothy Kim, San Jose, CA (US)

(73) Assignee: Audavi Corporation, San Jose, CA (US)

( * ) Notice: Subject to any disclaimer, the term of this patent is extended or adjusted under 35 U.S.C. 154(b) by 528 days.

(21) Appl. No.: 10/610,617

(22) Filed: Jun. 30, 2003

Related U.S. Application Data

(63) Continuation-in-part of application No. 10/423,233, filed on Apr. 24, 2003, now abandoned.

(51) Int. Cl.
*G06F 1/26* (2006.01)
*G06F 1/28* (2006.01)
*G06F 1/32* (2006.01)

(52) U.S. Cl. .................. 713/300; 713/320; 713/324

(58) Field of Classification Search ................ 713/300, 713/320, 324
See application file for complete search history.

(56) References Cited

U.S. PATENT DOCUMENTS

| | | | |
|---|---|---|---|
| 4,233,666 A | * | 11/1980 | Walberg et al. ............. 365/226 |
| 5,964,879 A | * | 10/1999 | Dunstan et al. ............. 713/340 |
| 6,233,693 B1 | * | 5/2001 | Berglund et al. ............ 713/340 |
| 6,841,954 B1 | * | 1/2005 | Nakabayashi ................ 318/62 |
| 6,845,422 B1 | * | 1/2005 | Shimada et al. ............ 710/305 |
| 6,868,501 B1 | * | 3/2005 | Saitou et al. ................ 713/330 |

* cited by examiner

*Primary Examiner*—Chun Cao
*Assistant Examiner*—Ji H. Bae
(74) *Attorney, Agent, or Firm*—Silicon Valley Patent Group LLP

(57) ABSTRACT

A portable storage device with a hard disk drive is reliably started up using only the power received through the interface cable, e.g., a USB cable. By not providing power to the internal circuit in the interface cable, e.g., the USB circuit in the USB cable, while the hard disk drive is starting up, a maximum amount of current may be supplied to the hard disk drive. Once the hard disk drive has started up, the internal circuit of the interface cable may then be electrically coupled to the power supply through the portable storage device. The power supply to the internal circuit of the interface cable need not be interrupted after the hard disk drive has started up, even when idling.

16 Claims, 4 Drawing Sheets

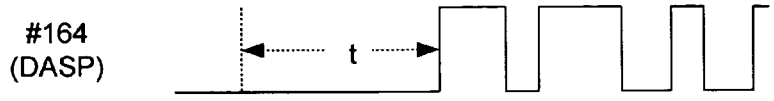
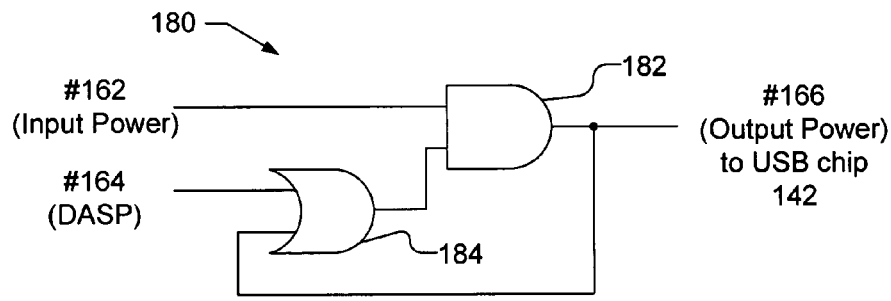
Fig. 5
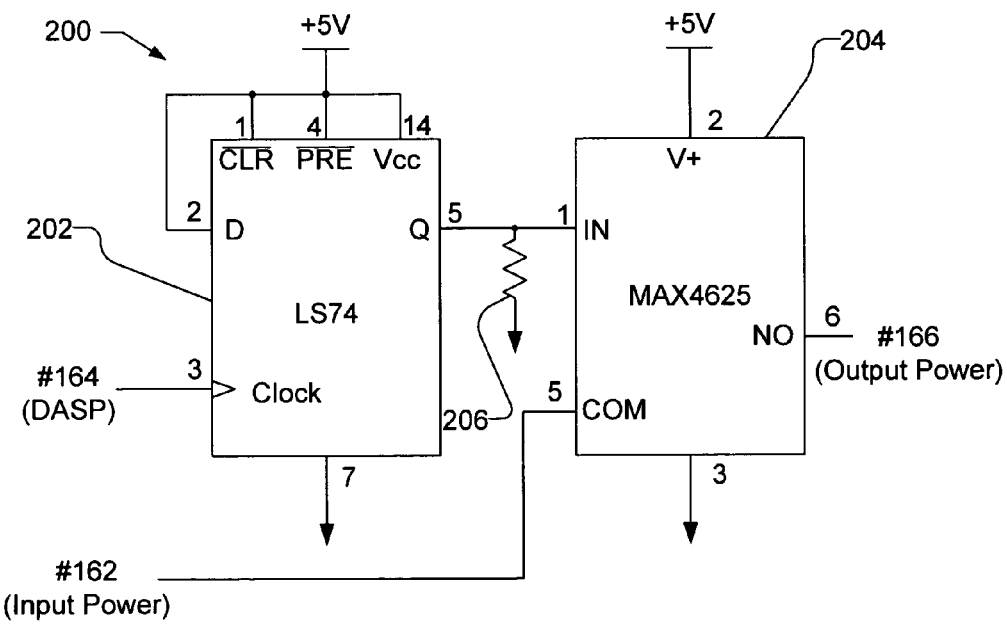
Fig. 6

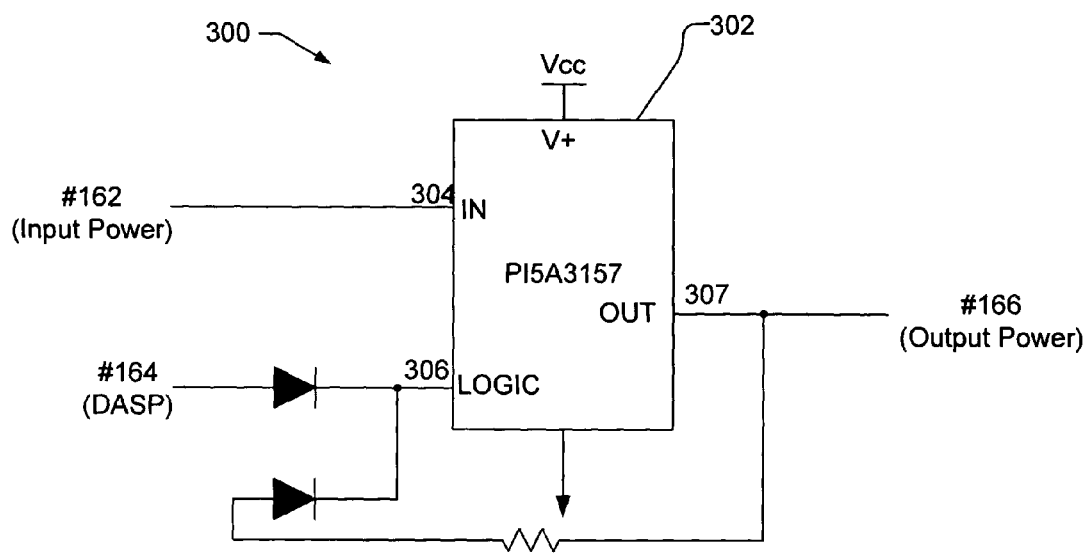
Fig. 7
Fig. 8A  #162 (Input Power) Received at 302
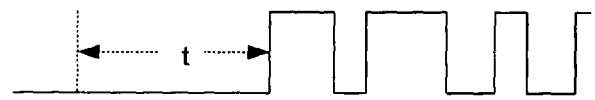
Fig. 8B  #164 (DASP) Received at 306
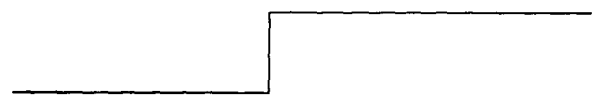
Fig. 8C  Output Power Received by 306
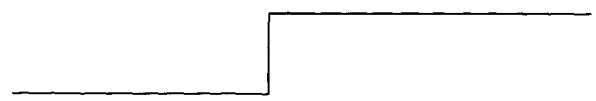
Fig. 8D  #166 (Output Power) Provided by 307

PORTABLE STORAGE DEVICE STARTUP

CROSS-REFERENCE TO RELATED APPLICATION

The present application is a continuation-in-part of the U.S. patent application entitled "Portable Storage Device Startup", having application Ser. No. 10/423,233 and filed Apr. 24, 2003 now abandoned.

BACKGROUND OF THE INVENTION

1. Field of the Invention

The present invention relates to portable data storage devices and, in particular, to powering up a hard disk drive in a portable data storage device with a limited power supply.

2. Discussion of the Related Art

Large capacity portable storage devices may be used in place of or in addition to conventional hard disk drives which are fixed within the computer housing. Portable storage devices may be coupled to the host computer as a separate drive, i.e., in a drive bay, or as a peripheral device standard interface devices, such as parallel port, PC Card, Universal Serial Bus (USB), and FireWire cables. An example of a portable storage device is described in U.S. Ser. No. 10/222,687, entitled "Data Storage Device", filed on Aug. 15, 2002, having the same assignee as the present disclosure, and which is incorporated herein by reference.

While standard interface devices, such as interface cables, can transfer data at an adequate rate, typically, these devices are limited in the amount of power that they may transferred through them. The power supply limitation of the interface devices is particularly problematic when the portable storage device uses a hard disk drive. Hard disk drives typically require a relatively large amount of power to start up, i.e., to accelerate the hard disks to the desired rotational speed.

Accordingly, portable storage devices typically include a power supply that is separate from the standard interface device that connects the portable storage device with the computer. While the separate power supply can easily provides enough power to start the hard disk drive, a separate power supply requires additional cable and interconnections as well as a power source, e.g., a power supply within the computer or access to an electrical outlet. The additional cable and interconnections are inconvenient and cumbersome, and access to a power supply, either from the computer or from an electrical outlet, may be limited, e.g., when the portable storage device is used with a lap top computer.

Thus, what is needed is an improved system for starting up a hard disk drive in a portable storage device without requiring a separate power supply.

SUMMARY

In accordance with the present invention, a portable storage device with a hard disk drive may be reliably started up using only the power received through the interface cable, e.g., a USB cable, and no other power sources. The internal circuit in the interface cable, e.g., the USB circuit in the USB cable, is electrically decoupled from the power supply while the hard disk drive is starting up to provide a maximum amount of current to the hard disk drive. Once the hard disk drive has started up, the internal circuit of the interface cable may then be electrically coupled to the power supply through the portable storage device. The power supply to the internal circuit of the interface cable need not be interrupted after the hard disk drive has started up, even when idling.

Thus, in accordance with one embodiment of the present invention, a method of starting up a hard disk drive within a portable storage device that is coupled a computer through an interface cable having an internal circuit includes providing power to the hard disk drive through the interface cable to start up the hard disk drive and reducing the power provided to the internal circuit of the interface cable while the hard disk drive is starting up. The method further includes increasing the power provided to the internal circuit of the interface cable through the portable storage device after the hard disk drive has started up. In one embodiment, the method includes providing no power to the internal circuit while the hard disk drive is starting up. In one embodiment, the method includes continuing to provide power to the internal circuit of the interface cable through the portable storage device when the hard disk drive is idling.

In another embodiment of the present invention, an apparatus that assists in the start up of a hard disk drive in a portable storage device, where the portable storage device is coupled to a computer through an interface cable having an internal circuit and the interface cable provides the input power to the portable storage device that is used to start up the hard disk drive, includes a circuit coupled between the hard disk drive and the interface cable. The circuit includes a first input terminal coupled to the interface cable; the first input terminal receives the input power from the interface cable. The circuit also includes a second input terminal coupled to the hard disk drive; the second input terminal receives a signal from the hard disk drive indicating when the hard disk drive has started up. The circuit further includes an output terminal coupled to the internal circuit of the interface cable, the output terminal providing power to the internal circuit of the interface cable, wherein the output terminal provides the power to the internal circuit of the interface cable after the second input terminal receives the signal from the hard disk drive.

In yet another embodiment of the present invention, a portable storage device includes a hard disk drive and a connector coupled to the hard disk drive, the connector connects to an interface cable that couples the portable storage device to a computer, the interface cable having an internal circuit, wherein the hard disk drive is coupled to a power supply for starting up through the interface cable and connector. The portable storage device further includes a means for selectively coupling the internal circuit of the interface cable to the power supply after the hard disk drive has started up. In one embodiment, the means for selectively coupling electrically decouples the internal circuit from the power supply before the hard disk drive has started up and electrically couples the internal circuit to the power supply after the hard disk drive has started up. In one embodiment, the means for selectively coupling includes a switching circuit that decouples the internal circuit from the power supply before the hard disk drive has started up and couples the internal circuit to the power supply after the hard disk drive has started up. The means for selectively coupling may further include a timing circuit that provides a timing signal to the switch, the timing circuit coupled to the hard disk drive and receives a signal from the hard disk drive when the hard disk drive has started up.

BRIEF DESCRIPTION OF THE DRAWINGS

FIGS. 4A, 4B, and 4C are timing diagrams for coupling the internal circuit of the interface device to the power supply, in accordance with an embodiment of the present invention.

FIG. 5 is an illustrative embodiment of a circuit that may be used in accordance with the present invention.

FIG. 6 shows a schematic of another circuit that may be used in accordance with one embodiment of the present invention.

FIG. 7 shows a schematic of another circuit that may be used in accordance with one embodiment of the present invention.

FIGS. 8A, 8B, 8C, and 8D are timing diagrams for the circuit shown in FIG. 7.

DETAILED DESCRIPTION

Figure 1:
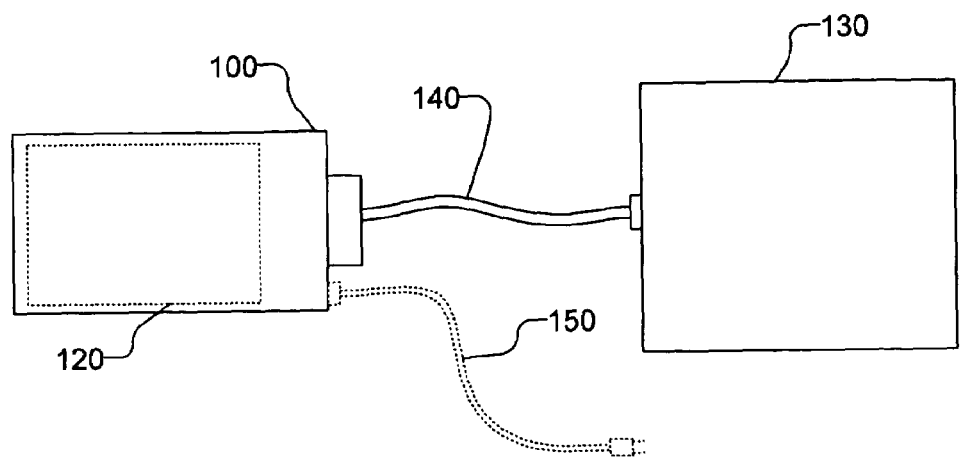
FIG. 1 shows a top view of a portable storage device connected to a computer via an interface cable.

FIG. 1 shows a top view of a portable storage device 100 connected to a processor 130 via an interface cable, 140, such as a Universal Serial Bus cable or any other type of interface cable. Portable storage device 100 includes a hard disk drive 120, which is e.g., a conventional 2.5 inch form factor disk drive such as those available from a variety of manufacturers including Toshiba, IBM and others. By way of example, a 2.5 inch form factor disk drive from IBM having model number IBM IC25N040ATCS04-0 may be used. For more information about portable storage device 100, see U.S. Ser. No. 10/222,687, entitled "Data Storage Device", filed on Aug. 15, 2002, having the same assignee as the present disclosure, and which is incorporated herein by reference.

During start up, the rotation of the disk in the hard disk drive 120 must accelerate until it reaches the desired rotational speed, e.g., 4200 rpm. During idle, however, the hard disk drive 120 need only maintain the rotational speed. Accordingly, the hard disk drive 120 required relatively large amount of power during start up compared to the power required during idle.

Due to the relatively large power demands on start up, a separate power cable 150 is conventionally used. The separate power cable 150, however, is inconvenient as it requires a separate cord and interconnections from the interface cable 140. Moreover, the use of a separate power cable 150 requires a power source such as an electrical outlet or the processor 130. Some processors, e.g., lap top computers, however, do not include an outlet for a power supply to a peripheral device. Moreover, when using a lap top computer an electrical outlet may not be accessible. Thus, it is desirable to eliminate the need for the power cable 150, as illustrated by the broken lines in FIG. 1.

Figure 2:
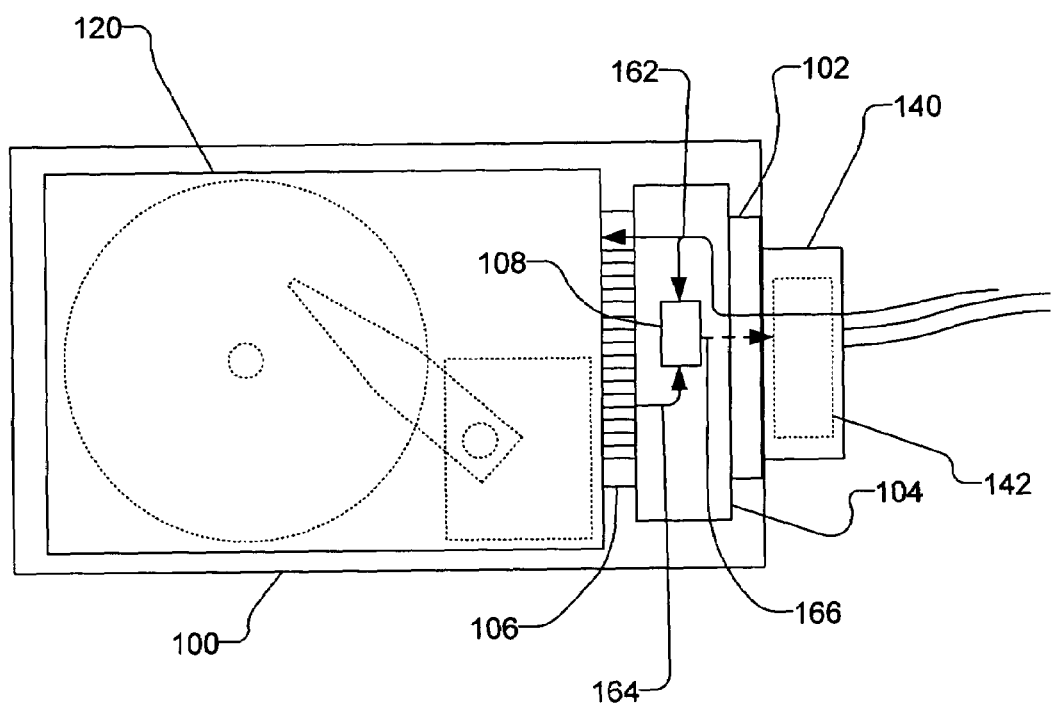
FIG. 2 is a schematic view of the portable storage device with a portion of the interface cable.

FIG. 2 is a schematic view of the portable storage device 100 with a portion of the interface cable 140. As can be seen in FIG. 2, the interface cable 140 includes an internal circuit 142. Typically, the internal circuit 142 of the interface cable 140 is coupled to a power supply through the peripheral to which the interface cable 140 is coupled. The internal circuit 142, by way of example, may be a USB circuit in an interface cable.

As shown in FIG. 2, portable storage device 100 includes a connector 102, which is used to connect to the interface cable 140. The connector 102 is electrically coupled to a printed circuit board 104, which in turn is connected to the hard disk drive 120 by way of a flexible circuit cable 106.

The power requirements for a 2.5 inch hard disk drive, such as that used in portable storage device 100, include a maximum peak of 900 mA on start up and approximately 130 mA during idle. The maximum peak current, however, is a worst case specification and in many cases, a 2.5 inch hard disk drive requires less current to start up. The specifications for a conventional interface cable, such as a USB cable, provides for a maximum of 500 mA to the device to which it is coupled. Despite such a specification, however, a USB interface cable typically provides more current than specified in most cases.

Generally the specified 500 mA is too little to reliably start up hard disk drive 120. However, the internal circuit 142 in the interface cable uses approximately 120 mA. By reducing power to the internal circuit 142 during start up of the hard disk drive 120, the power that would have been provided to the internal circuit 142 can be supplied to the hard disk drive 120. Thus, if the internal circuit 142 receives no power, the interface cable 140 can provide approximately 620 mA to the hard disk drive 120. While 620 mA is below the maximum peak specification of 900 mA for start up, it has been found that 620 mA is adequate to reliably start up the hard disk drive 120; particularly if no other peripherals are installed during start up.

Thus, in accordance with the present invention, a circuit 108 sometimes referred to herein as a delay circuit, is used to prevent power from being supplied to the internal circuit 142 until the hard disk drive 120 has started up. Until the hard disk drive 120 is started up, there is no need for power anywhere else in the system, including the internal circuit 142 in the interface cable 140. The delay circuit 108 may be included in the portable storage device 100, e.g., between the connector 102 and the flexible circuit 106 on the printed circuit board 104, or e.g., between the interface cable 140 and the connector 102.

As illustrated by arrows in FIG. 2, the input current 162 flows through interface cable 140 and is provided to the hard disk drive 120 for start up, e.g., the current passes through 102, printed circuit board 104, and flexible circuit 106 to the hard disk drive 120. The input current 162 is also received by the delay circuit 108.

Once the hard disk drive 120 is started, a drive active slave present (DASP) signal 164 is provided by the hard disk drive 120 and is received by the delay circuit 108. Once the DASP signal 164 is received, the delay circuit 108 produces output power 166 to the internal circuit 142, as indicated by the broken arrow in FIG. 2. Thus, no current is used by the internal circuit 142 until the hard disk drive 120 is active. Accordingly, a maximum amount of current can be provided to the hard disk drive 120, which ensures a reliable start up of the drive.

Figure 3:
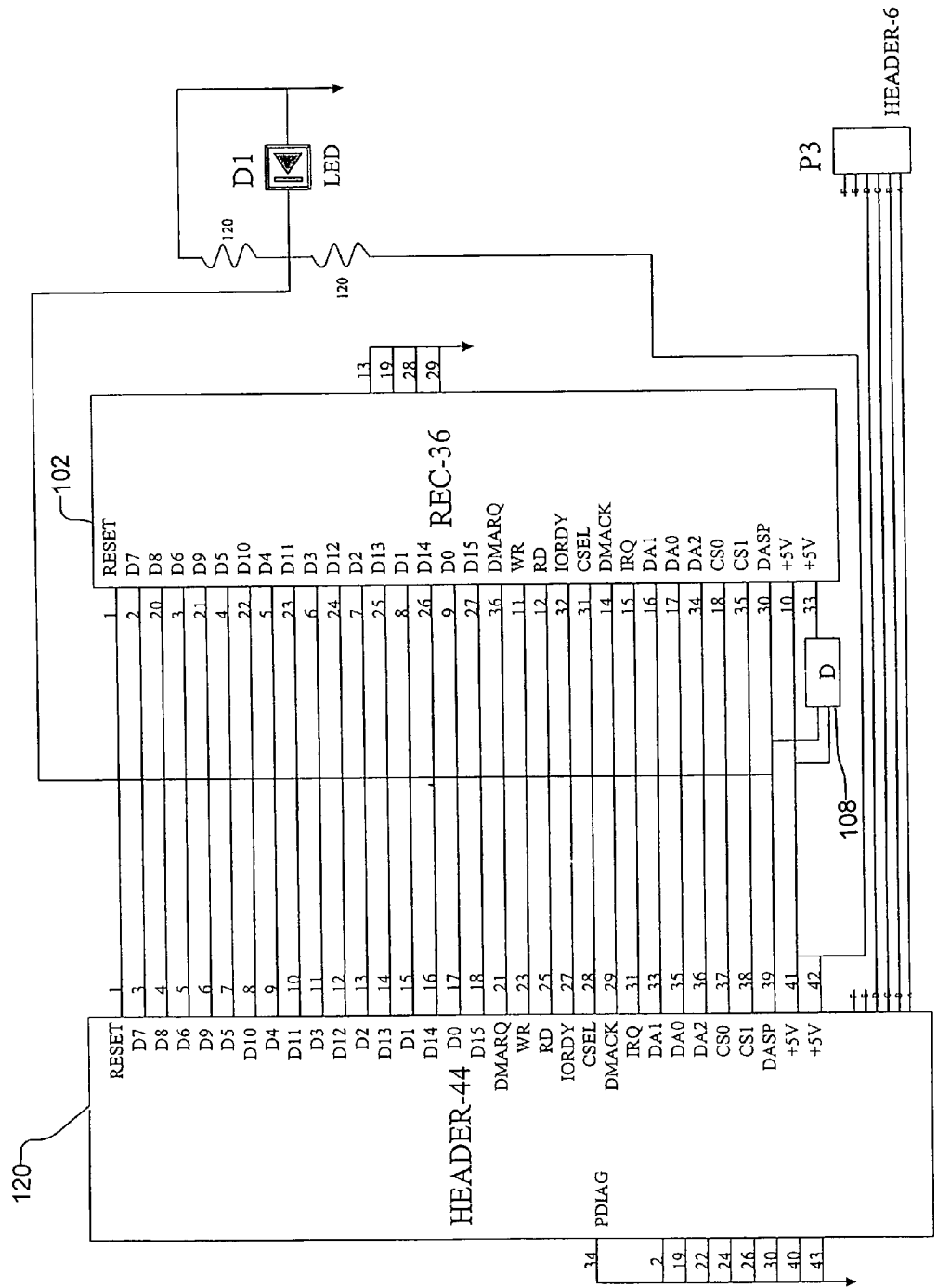
FIG. 3 is a schematic diagram showing an embodiment of the connections between the hard disk drive to the connector in the portable storage device.

FIG. 3 is a schematic diagram showing an embodiment of the connections between the hard disk drive 120 to the connector 102. As can be seen, the delay circuit 108 is deposed between the hard disk drive 120 and the connector 102. The delay circuit 108 is coupled to the +5 V input from pin 10 on the connector 102 and the DASP signal on pin 39 of the hard disk drive 120. The output terminal of the delay circuit 108 is coupled to +5 V pin 33 on the connector 102, which provides the power to the internal circuit 142 on the interface cable 140.

FIGS. 4A, 4B, and 4C are timing diagrams of the input power 162, DASP signal 164, and the desired output power 166, in accordance with the present invention. When the input power 162 rises, the hard disk drive 120 will begin to start up. After a finite amount of time t, the hard disk drive 120 will be active and will send a DASP signal 164 indicating that it is active. When the DASP signal 164 goes high, indicating that the hard disk drive 120 is active, output power 166 can be provided to the internal circuit 142. However, during time t, i.e., while the hard disk drive 120 is starting up, no output power 166 is provided to the internal circuit 142. As illustrated in FIG. 4B, once the hard disk drive 120 is started, the DASP signal 164 may toggle between high and low. Nevertheless, because the hard disk drive 120 is already active only a small amount of power, i.e., 120 mA, is required to idle the hard disk drive 120. Accordingly, once the output power 166 is provided to the internal circuit 142, the output power 166 can be constantly provided to the internal circuit 142 even when the DASP signal 164 toggles between high and low.

FIG. 5 is an embodiment of a delay circuit 180 that illustrates the functionality in accordance with an embodiment of the present invention. As shown in FIG. 5, the delay circuit 180 includes logic AND gate 182 and a logic OR gate 184. The AND gate 182 has two input terminals, one of which receives the input power 162 and the other is coupled to the output terminal of the OR gate 184. The OR gate 184 has two input terminals, one of which receives the DASP signal 164 and the other is coupled to the output terminal of the AND gate 182. The output terminal of the AND gate 182 provides the output power 166 to the internal circuit 142.

Thus, as can be seen, the output power 166 to the internal circuit 142 is delayed until after the AND gate 182 receives the input power 162, and the OR gate 184 receives a high DASP signal 164. Once the output power 166 is provided by AND gate 182, the circuit 180 latches so that the AND gate 182 continues to provide the output power 166 to internal circuit 142 even if the DASP signal 164 toggles low.

It should be understood that FIG. 5 is merely an illustrative embodiment, and that many possible circuits may be used to implement the present invention.

For example, FIG. 6 shows a schematic of a delay circuit 200 that may be used as delay circuit 108, in accordance with one embodiment of the present invention. As shown in FIG. 6, a D type flip-flop 202, such as that manufactured by Texas Instruments as part number LS74, has the D input terminal tied high. The clock input of flip-flop 202 is coupled to the DASP signal 164. The Q output terminal of flip-flop 110 is coupled to the input terminal IN of a power switch 204, such as that manufactured by Maxim as part number MAX4625. The input terminal IN is also coupled to ground through a resistor 206. The common terminal COM of switch 204 is coupled to the input power 162 and the normally open (NO) output terminal produces the resulting output power 166.

In operation, when the input power 162 and DASP signal 164 are low, the output power 166 provided by switch 204 will be low. When the input power 162 is high, but the DASP signal 164 is still low, i.e., while the hard disk drive 120 is starting up, the IN terminal of switch 204 will be low, and thus, the output power 166 provided by switch will be low. When the DASP 164 goes high, i.e., when the hard disk drive 120 is active, the output terminal Q of flip-flop 202 will go high. Thus, the switch 204 receives a high signal at the input terminal IN, and accordingly, the output power 166 provided by switch 204 will be high. Because the input terminal D of flip-flop 202 is tied high, the output terminal Q of flip-flop 202 will remain high even if the DASP signal 164 at the clock input toggles between high and low, as illustrated in FIGS. 4A, 4B, and 4C. Thus, the switch 204 is latched on. When the circuit is powered down, the input terminal IN of switch 204 is drained to ground through resistor 206.

FIG. 7 shows another embodiment of a delay circuit 300 that may be used as delay circuit 108, in accordance with an embodiment of the present invention. As shown in FIG. 7, a switch 302, such as that manufactured by Pericom Semiconductor Corp. as part number PI5A3157, has the input terminal 304 coupled to the input power 162. The logic input 306 of switch 302 is coupled to the DASP signal 164 through a rectifier diode 308. The output terminal 307 of switch 302 is the output power 166 and is coupled to the logic input 306 through resistor 310 and another rectifier diode 312. The use of rectifier diodes 308 and 312 in place of the D type flip flop 202 (shown in FIG. 6) results in lower power consumption.

FIGS. 8A, 8B, 8C, and 8D are timing diagrams of the input power 162 received at input terminal 304, DASP signal 164 received at logic terminal 306, the output power 166 received at logic terminal 306, and the output power 166 provided by the output terminal 307, respectively.

Although the invention has been described with reference to particular embodiments, the description is only an example of the application of the present invention and should not be taken as a limitation. Various other adaptations and combinations of features of the embodiments disclosed are within the scope of the invention as defined by the following claims.

What is claimed is:

1. A method of starting up a hard disk drive within a portable storage device that is coupled to a computer through an interface cable having an internal circuit, said method comprising:
   providing power to the hard disk drive through the interface cable to start up the hard disk drive;
   reducing the power provided to the internal circuit of the interface cable while the hard disk drive is starting up;
   increasing the power provided to the internal circuit of the interface cable through the portable storage device after the hard disk drive has started up; and
   providing a signal from the hard disk drive indicating that the hard disk drive is active, wherein increasing the power to the internal circuit occurs after providing a signal from the hard disk drive.

2. The method of claim 1, wherein increasing the power provided to the internal circuit of the interface cable through the portable storage device after the hard disk drive has started up comprises:
   receiving the signal from the hard disk drive indicating that the hard disk drive is active; and
   switchably providing power to the internal circuit of the interface cable when the signal from the hard disk drive is received.

3. The method of claim 1, further comprising continuing to provide power to the internal circuit of the interface cable through the portable storage device when the hard disk drive is idling.

4. The method of claim 1, wherein reducing the power provided to the internal circuit comprises providing no power to the internal circuit.

5. An apparatus for assisting in the start up of a hard disk drive in a portable storage device, the portable storage device being coupled to a computer through an interface cable having an internal circuit, the interface cable providing the input power to the portable storage device that is used to start up the hard disk drive, the apparatus comprising:
- a circuit coupled between the hard disk drive and the interface cable, the circuit comprising:
  - a first input terminal coupled to the interface cable, the first input terminal receiving the input power from the interface cable;
  - a second input terminal coupled to the hard disk drive, the second input terminal receiving a signal from the hard disk drive indicating when the hard disk drive has started up;
  - an output terminal coupled to the internal circuit of the interface cable, the output terminal providing power to the internal circuit of the interface cable, wherein the output terminal provides the power to the internal circuit of the interface cable after the second input terminal receives the signal from the hard disk drive.

6. The apparatus claim 5, wherein the circuit comprises:
a flip-flop having a clock terminal and an output terminal, wherein the second input terminal of the circuit is the clock terminal of the flip flop; and
a switch having a first input terminal, a second input terminal, and an output terminal, wherein the output terminal of the circuit is the output terminal of the switch, and wherein the first input terminal of the circuit is the first input terminal of the switch, the second input terminal of the switch is coupled to the output terminal of the flip-flop.

7. The apparatus of claim 6, wherein the flip-flop has an input terminal that is coupled to a voltage source.

8. The apparatus of claim 5, the circuit comprising a latching element to continue providing the output voltage to the internal circuit of the interface cable when the hard disk drive is idling.

9. The apparatus of claim 5, wherein the circuit comprises a switch having a first input terminal, a second input terminal, and an output terminal, wherein the output terminal of the circuit is the output terminal of the switch, and wherein the first input terminal of the circuit is the first input terminal of the switch, the second input terminal of the circuit is the second input terminal of the switch, wherein the output terminal of the switch is coupled to the second input terminal of the switch.

10. The apparatus of claim 9, wherein the circuit further comprises a first diode disposed between the hard disk drive and the second input terminal of the switch and a second diode disposed between the output terminal of the switch and the second input terminal of the switch.

11. A portable storage device comprising:
- a hard disk drive;
- a connector coupled to the hard disk drive, the connector connects to an interface cable that couples the portable storage device to a computer, the interface cable having an internal circuit, wherein the hard disk drive is coupled to a power supply for starting up through the interface cable and connector; and
- a means for selectively coupling the internal circuit of the interface cable to the power supply after the hard disk drive has started up, wherein the means for selectively coupling comprises:
  - a switching circuit that decouples the internal circuit from the power supply before the hard disk drive has started up and couples the internal circuit to the power supply after the hard disk drive has started up.

12. The portable storage device of claim 11, wherein the means for selectively coupling electrically decouples the internal circuit from the power supply before the hard disk drive has started up and electrically couples the internal circuit to the power supply after the hard disk drive has started up.

13. The portable storage device of claim 11, wherein the means for selectively coupling is disposed between the hard disk drive and the interface cable.

14. The portable storage device of claim 13, wherein the means for selectively coupling is disposed between the hard disk drive and the connector.

15. The portable storage device of claim 11, wherein the means for selectively coupling further comprises:
- a timing circuit that provides a timing signal to the switch, the timing circuit coupled to the hard disk drive and receives a signal from the hard disk drive when the hard disk drive has started up.

16. The portable storage device of claim 11, wherein said means for selectively coupling maintains the electrical coupling of the internal circuit to the power supply when the hard disk drive is idling.

* * * * *